Dec. 14, 1954  W. H. SCHWARTZ  2,696,641
INJECTION CYLINDER FOR MOLDING MACHINES
Filed April 10, 1951
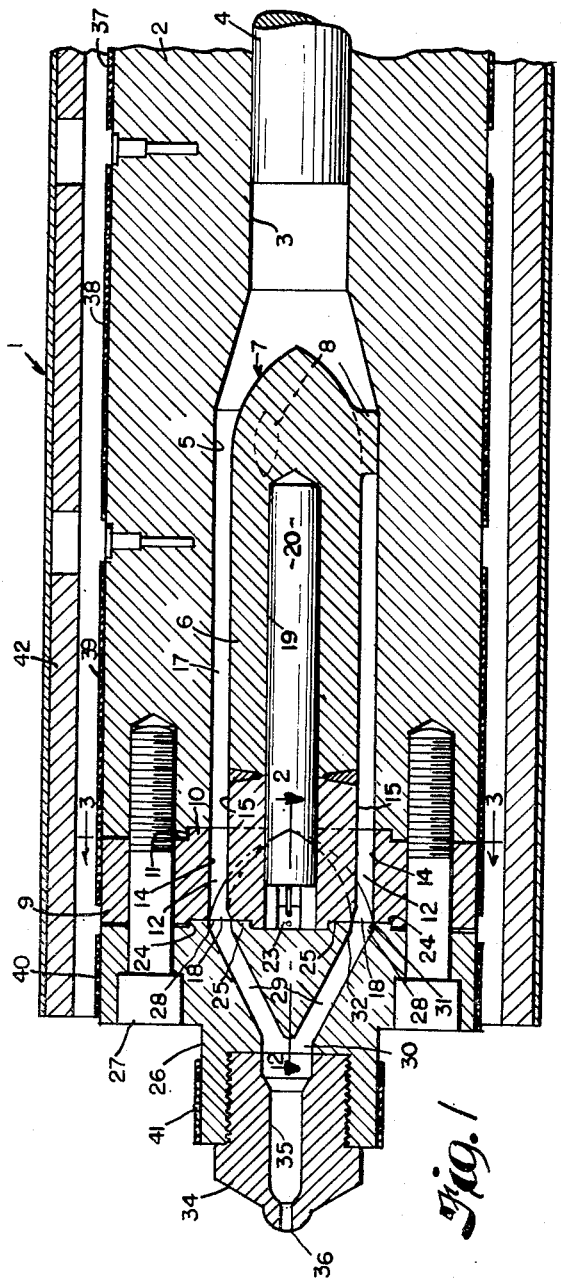
INVENTOR.
WILLIAM H. SCHWARTZ
BY
Oberlin & Limbach
ATTORNEYS.

United States Patent Office 2,696,641
Patented Dec. 14, 1954

2,696,641

INJECTION CYLINDER FOR MOLDING MACHINES

William H. Schwartz, Cleveland, Ohio, assignor to Lester Engineering Company, Cleveland, Ohio, a corporation of Ohio Application April 10, 1951, Serial No. 220,230

2 Claims. (Cl. 18—30)

The present invention relates generally as indicated to an injection cylinder for molding machines, and more particularly to certain improvements in that portion of the cylinder whereat the charge, usually a thermoplastic material, is heated to plastic condition as it is forced therethrough by an injection plunger and to this end it is common practice to provide a spreader (commonly referred to in the art as a "torpedo" or "pineapple") over which the body of molding material is adapted to flow as a relatively thin annular or tubular stream. The molding material is plasticized by heat supplied from the surrounding cylinder and from within the spreader, the material thus heated and plasticized then being transformed from tubular form so as to flow as a rod-like stream for injection through an injection nozzle into a mold cavity.

One of the problems connected with the provision of an injection cylinder assembly of the character referred to which has an injection nozzle centrally located at one end is that the heating element in the spreader can only be assembled thereinto from the shank end whereby to require a cap, plug, or the like welded to the spreader shank. Therefore, in the event of burning out of said element, replacement thereof is difficult or impossible and as a result, the operator may elect to use the machine with an unheated spreader in order to save the cost of replacement of the entire spreader and heater assembly but at the expense of a lengthened molding cycle and inferior product.

Another difficulty heretofore experienced results from leakage or creeping of material into crevices between axially interfitting surfaces of the spreader and the cylinder whereby such material chars or burns in such crevices and thus contaminates the material flowing therepast. Furthermore, crevices, sharp corners, and the like in the path of flow cause the material to "hang up" thereat, inducing non-uniform flow of the material as well as overheating thereof with consequent decomposition in some instances and burning or charring with resulting contamination.

It is one main object of the present invention to solve the foregoing and other problems by providing: an injection cylinder in which the heater in the internally heated spreader is readily accessible for servicing or replacement; a cylinder and spreader assemblage eliminating reliance upon close fitting axially interfitting surfaces of the cylinder and spreader for the purpose of defining flow passages for the molding material; a spreader which is directly clamped between opposed transverse faces of the cylinder parts; and a spreader which is integrally formed with one or more converging channels communicating with the annular space defined between the spreader shank and the cylinder bore and leading toward the discharge nozzle of the cylinder assembly, such channels being characterized by the complete absence of sharp corners and crevices at and into which molding material can hang up and creep.

Another object of this invention is to provide a cylinder and spreader assembly in which the spreader is rendered readily removable for replacement or servicing by reason of omission of axially interfitting surfaces on the spreader and cylinder or threaded connections between said parts into which molding material can creep and thereby freeze the spreader and cylinder together.

Another object of this invention is to provide an injection cylinder which enables thorough plasticization of the charge at lower temperatures and in shorter periods of time whereby to prevent overheating and decomposition and to materially shorten the molding cycle.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a diametrical cross-section view of one form of injection cylinder constituting the present invention;

Figs. 2 and 3 are cross-section views taken respectively along the lines 2—2 and 3—3, Fig. 1; and Fig. 4 is a side elevation view, partly in section, of the body of molding material to show the streamlined flow thereof and the manner in which it is smoothly transformed from relatively thin tubular form to rod-like form.

Referring now in detail to the drawing and first to Fig. 1, the cylinder assembly 1 constituting the present invention comprises a cylinder body 2 formed with a bore 3 at one end in which an injection plunger 4 is reciprocable so as to force a charge of molding material toward the other end. The bore 3 is somewhat enlarged as at 5 and receives from the large end, in concentric relation thereto, the shank 6 of a spreader 7, the end of said shank 6 preferably being pointed as shown or rounded if desired and provided with streamlined ribs 8 supporting the end of said shank 6 centrally within the bore 5.

Said spreader 7 includes a collar portion 9 and an axially extending flange or annular rib 10 which fits closely into a counterbore 11 in the end of said cylinder body 2. The end surface of said rib 10 and the bottom surface of said counterbore 11 are preferably disposed in a plane transverse to the axis of said cylinder, such surfaces being ground and lapped together so as to form a fluid tight metal-to-metal joint upon clamping together of said body 2 and spreader 7. Moreover, the cylindrical surfaces of said rib 10 and said counterbore 11 are closely fitted so as to accurately locate the shank 6 of said spreader 7 centrally within bore 5. As apparent, said rib 10 and counterbore 11 may be reversed if desired, that is to say that said rib 10 may be formed on the end of the cylinder body 2 and the counterbore 11 may be formed in the spreader collar 9.

As best shown in Fig. 3, said spreader 7 adjacent shank 6 is formed with one or more converging channels 12, herein two, each bounded by cylindrical walls 14 and 15 respectively coinciding with the wall of bore 5 and with the outer wall of the spreader shank 6, and end walls 16 of concavely curved form tangent to the respective walls 14 and 15 aforesaid. Such channels 12 are each of 180° circumferential extent between walls 16 at the plane where each communicates with the annular space 17 defined between shank 6 and bore 5. The channels 12 progressively decrease in circumferential extent axially from this plane so as to smoothly join with a corresponding number of axial bores 18 through the left-hand end of the spreader 7.

One convenient manner of forming one or more of such channels 12 (herein two being shown) is to use a milling cutter having a hemi-spherical end portion and, while rotating the cutter about its longitudinal axis, advancing it axially and circumferentially relative to the spreader 7, the spreader at this stage of manufacture preferably having only a very short shank portion to which the remaining shank may be welded after completion of the channels. Preferably, the diameter of said cutter will be equal to the radial dimension of the annular space 17 whereby the outer and inner walls 14 and 15 of said channels 12 will be in perfect alignment and flush with the walls of said bore 5 and shank 6 respectively so as to eliminate any ledges at the aforesaid joint between spreader 7 and cylinder body 2. Moreover, because such channels 12 are integrally formed in spreader 7, there are no sharp corners or edges or crevices to cause "hanging up" or creeping of material with resulting burning and charring and consequent contamination or non-uniform flow of the material and therefore non-uniform heating thereof.

Said spreader 7 after formation of channels 12 therein and welding of shank 6 thereto is formed with a central bore 19 extending from the collar end 9 toward the point of the shank 6, such bore 19 being adapted to snugly and replaceably receive therein an electric heating element 20. Alongside said heating element 20 there is a drilled hole in the shank 6 for receiving a thermocouple 21 for controlling energization and deenergization of said heating element 20. Diametrically across the collar end 9 of said spreader 7 is a slot 23 constituting a wireway for said thermocouple 21 and for the electrical leads of said heating element 20.

The aforesaid bores 18 in said spreader 7 lead to counterbores 24 into which extend the cylindrical bosses 25 of a nozzle body or cylinder base 26, the ends of said bosses 25 and the bottoms of said counterbores 24 being adapted to be clamped in tight metal-to-metal engagement whereby to prevent leakage of the molding material into slot 23 and bore 19 of said spreader 7 and also externally between said base 26 and said spreader 7.

Clamping of said spreader 7 to cylinder body 2 is effected as by means of a plurality of screws 27 extending through said base 26 and the collar portion 9 of said spreader and having engagement with threaded holes in the end of said cylinder body 2. The heads of said screws 27 are seated in counterbores in said base 26, and as evident the tightening of said screws will firmly clamp said spreader 7 so as to form fluid tight joints between the aforesaid rib 10 and counterbore 11 and also between the ends of said bosses 25 and the bottoms of said counterbores 24.

Alternatively, the bosses 25 and counterbores 24 and the aforesaid slot 23 may be reversed if desired, that is to say that said bosses 25 may be formed on spreader 7 and said counterbored recesses 24 may be formed in base 26 and the diametrically extending slot 23 may be formed in said base 26 in whole or in part. Because the contacting areas of said bosses 25 and counterbores 24 and said rib 10 and counterbore 11 are relatively small, extremely high clamping pressure may be effected to withstand high pressure injection without leakage and to enable heating of the parts of the cylinder assembly 2 without development of leakage crevices.

Said cylinder base 26 is formed with two axially extending bores 28 of the same size and aligned with the bores 18 through the spreader 7, such alignment being effected by making said bosses 25 of the same diameter as or complementary with the respective recesses 24. Leading from said bores 28 are two converging passages 29 which merge together in an opening 30 in base 26. In forming bores 28 and passages 29 it is preferred to use drills or end mills having ball points whereby to produce smoothly curved corners 31 and to minimize the handwork to only the rounding of corners 32.

The nozzle body or cylinder base 26 is threaded as shown for threaded engagement with an injection nozzle 34, said nozzle having a flat end face adapted to form a fluid tight joint with said base 26, the engaged faces being ground and lapped together. Nozzle 34 is provided with a bore 35 terminating in an orifice 36, said bore 35 being aligned with and of the same size as the opening 29 at the end of said base 26 so as to eliminate steps and sharp corners which would impede free flow of molding material.

The cylinder assembly 1 just described is provided with electric or equivalent heating elements 37 to 41 in the form of sleeves therearound extending along cylinder body 2, spreader collar 9 and nozzle body or cylinder base 26. If desired, an insulating jacket 42 may surround the entire cylinder assembly to minimize heat loss therefrom.

In operation of the cylinder 1, molding material in desired solid form such as pellets, chips, grains, or the like is introduced into the cylinder bore 3 adjacent to the end of injection plunger 4. Upon movement of said plunger 4 toward the left as viewed in Fig. 1, the molding material will be forced through the bores 3 and 5 of cylinder body 2 and over shank 6 and thus will be heated by the heating elements 20 and 37 to 41 while under high pressure and thereby caused to be heated to plastic condition. As the material flows through the converging channels 12 the same will be smoothly and gradually, with minimum pressure drop, converted from annular or tubular form 43 into two streams 45 of circular cross-section as best shown in Fig. 4. At this stage of the travel of the material, the same is passing through the bores 18 and 28 of spreader 7 and cylinder base 26. Thereafter, the two streams 45 converge toward each other in passages 29 and smoothly merge as at 46 in opening 30, and finally the material is forced through bore 35 and orifice 36 in nozzle 34 for squirting into the cavity of a mold with which the end of said nozzle 34 is adapted to have engagement. Thus, as evident from Fig. 4, the body of plastic material is not at any stage subjected to flow into or over sharp corners nor subjected to abrupt turns nor is there any opportunity for the material to creep into close fitting axially overlapping surfaces in the cylinder and spreader assemblage 1.

By reason of the foregoing construction, molding temperatures may be substantially reduced because of the uniform flow of the material through the cylinder and thorough plasticization thereof; for example it has been possible to reduce the molding temperature from 420 to 350° F. in the case of certain vinyl materials which often are subjected to partial decomposition at the higher mentioned temperature. Moreover, the lower temperature injection, uniform flow, and thorough plasticization has resulted, in some instances, in a 25% reduction in the time of the molding cycle. With the present construction, the actual temperatures of cylinder bore 5 and of spreader shank 6 including channels 12 and bores 18, 28, and 29 may be lower because of the intimate mixing and blending of the material and uniform flow thereof along the annular space 17, through the channels 12, and through the bores 18, 28, and 29 to the injection nozzle 34. In addition, the reduced temperature of the material and injection at lower viscosity is desired to enable build-up of a higher back pressure from orifice 36 to plunger 4 for effective compression and plasticizing of the material. It is preferred that the bores 18, 28, and 29 be of diameter equal to or greater than the radial dimension of space 17 and channels 12 so as not to retsrict flow of the material thereat.

Although the coaxial positioning of said cylinder body 2, said spreader 7, and said cylinder base 26 is herein effected by complementary axially overlapping surfaces surrounding the fluid tight joints, it is to be understood that, in some instances, it may be desirable to provide dowels, keys, or the like or to have the shanks of screws 27 closely fitted in the holes of the cylinder body 2, of the spreader collar 9, and of the base 26.

Other modes of applying the principle of the invention may be employed, change being made as regards the details described, provided the features stated in any of the following claims, or the equivalent of such, be employed.

I therefore particularly point out and distinctly claim as my invention:

1. In combination, an injection cylinder body, a base, a spreader having a head clamped between said cylinder body and said base and a shank extending into said cylinder body to define therewith an annular passage for flow of molding material, said spreader being formed with a longitudinally extending central bore open at the end of said head and adjacent to said base and extending coaxially into said shank, an electric heating element removably fitted into such bore, said head and said base defining therebetween a radially extending passage leading from such bore to the exterior of said combination to accommodate the leads for said electric heating element whereby, upon removal of said base, said electric heating element and the leads therefor may be withdrawn from said spreader, said head being integrally formed with at least one channel bounded by cylindrical side walls coaxial with such bore and coinciding with the walls of such annular passage and by circumferentially spaced, concavely curved end walls tangent to such side walls and merged together adjacent to such annular passage, such channel being of progressively decreasing circumferential extent between such end walls in a direction axially of said spreader and terminating in a circular cross-section opening which is located radially outward of such bore and circumferentially spaced from such radially extending passage and which is of diameter approximately the same as the radial distance between the side walls of said channel whereby a body of molding material adapted to flow through such annular passage and channel toward such opening is progressively transformed from annular form to rod-like form, said base being formed with a circular cross-section passage of substantially the same diameter as such opening and in register therewith for continued flow of the material in rod-like form through said base.

2. In combination, an injection cylinder body, a base, a spreader having a head clamped between said cylinder body and said base and a shank extending into said cylinder body to define therewith an annular passage for flow of molding material, said spreader being formed with a longitudinally extending central bore open at the end of said head and adjacent to said base and extending coaxially into said shank, an electric heating element removably fitted into such bore, said head and said base defining therebetween a radially extending passage leading from such bore to the exterior of said combination to accommodate the leads for said electric heating element whereby, upon removal of said base, said electric heating element and the leads therefor may be withdrawn from said spreader, said head being integrally formed with a pair of channels each bounded by cylindrical side walls coaxial with such bore and coinciding with the walls of such annular passage and by circumferentially spaced, concavely curved end walls tangent to such side walls, the end walls of such channels merging together adjacent to such annular passage, such channels being of progressively decreasing circumferential extent between the end walls thereof in a direction axially of said spreader and terminating in a pair of circular cross-section openings which are located radially outward of such bore and circumferentially spaced from such radially extending passage and which are of diameter approximately the same as the radial distance between the side walls of such channels whereby a body of molding material adapted to flow through such annular passage and such channels is progressively transformed from annular form into two streams of rod-like form, said base being formed with two circular cross-section passages of substantially the same diameter as such openings and in register therewith, such two passages in said base converging in a single discharge opening wherefrom the molding material issues in single rod-like form.

References Cited in the file of this patent

UNITED STATES PATENTS

| Number | Name | Date |
|---|---|---|
| 2,206,098 | Lester | July 2, 1940 |
| 2,233,558 | Shaw | Mar. 4, 1941 |
| 2,308,636 | Wheeler | Jan. 19, 1943 |
| 2,367,144 | Shaver | Jan. 9, 1945 |
| 2,475,395 | Lester | July 5, 1949 |